Figure 1:
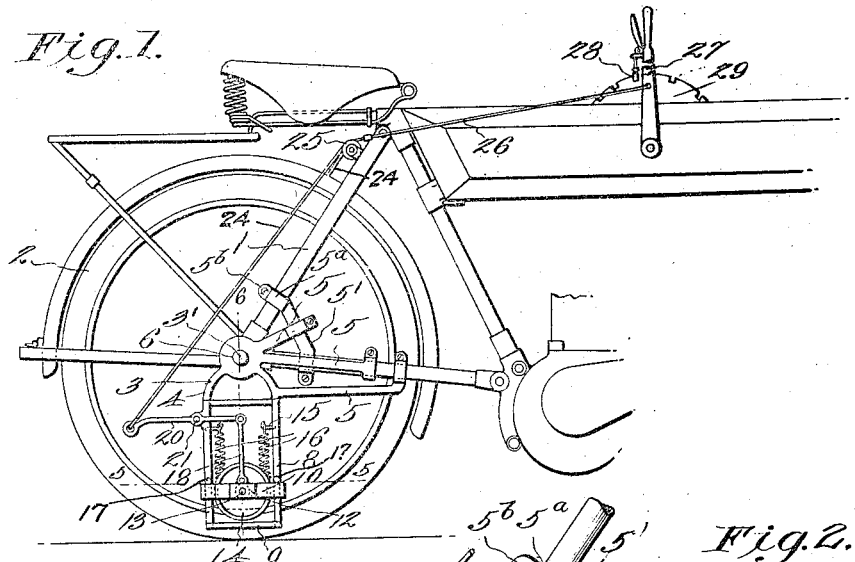

C. MYRIE.
MOTOR CYCLE ATTACHMENT.
APPLICATION FILED JUNE 1, 1917.

1,241,423.

Patented Sept. 25, 1917.
2 SHEETS—SHEET 1.

WITNESSES

INVENTOR
Cecil Myrie,
BY Victor J. Evans
ATTORNEY

C. MYRIE.
MOTOR CYCLE ATTACHMENT.
APPLICATION FILED JUNE 1, 1917.
1,241,423.
Patented Sept. 25, 1917.
2 SHEETS—SHEET 2.
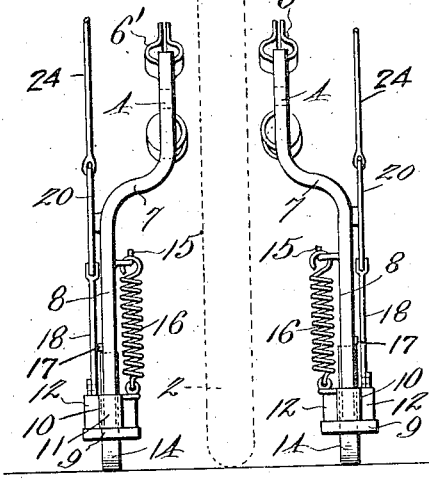
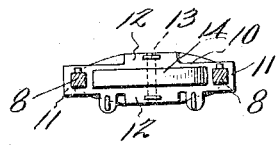
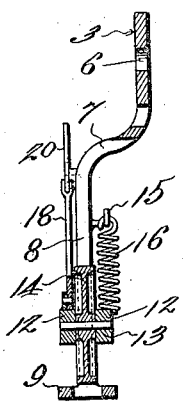
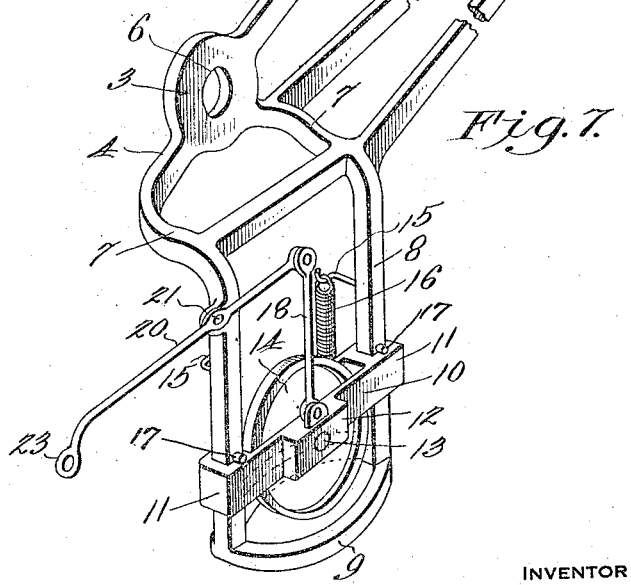
WITNESSES
INVENTOR
Cecil Myrie,
BY Victor J. Evans
ATTORNEY

UNITED STATES PATENT OFFICE.

CECIL MYRIE, OF ST. ANDREW, JAMAICA.

MOTOR-CYCLE ATTACHMENT.

1,241,423.	Specification of Letters Patent.	Patented Sept. 25, 1917.

Application filed June 1, 1917. Serial No. 172,261.

*To all whom it may concern:*

Be it known that I, CECIL MYRIE, a subject of the King of Great Britain, residing at St. Andrew, Jamaica, B. W. I., have invented new and useful Improvements in Motor-Cycle Attachments, of which the following is a specification.

This invention relates to motor-cycle supporting and balancing means, the primary object being to provide in connection with a motor-cycle or similar vehicle, means whereby the motor-cycle may be effectively supported in an upright position, as well as means whereby the rear wheel of the cycle may be elevated to permit of the starting of the engine without necessitating the operator leaving his seat, and further whereby such supporting and balancing means may effect in braking the machine so as to bring the same to a stop after the supporting or balance means has been lowered.

A further object of the invention is to produce a device of this class which may be readily applied to any ordinary make of motor-cycles or like vehicles which is adapted to be operated at a point convenient to the seat for the operator, and which is simple, strong and efficient for the purpose devised.

With the above and other objects in view the improvement resides in the construction, combination and arrangement of parts set forth in the following specification and falling within the scope of the appended claims.

Figure 2:
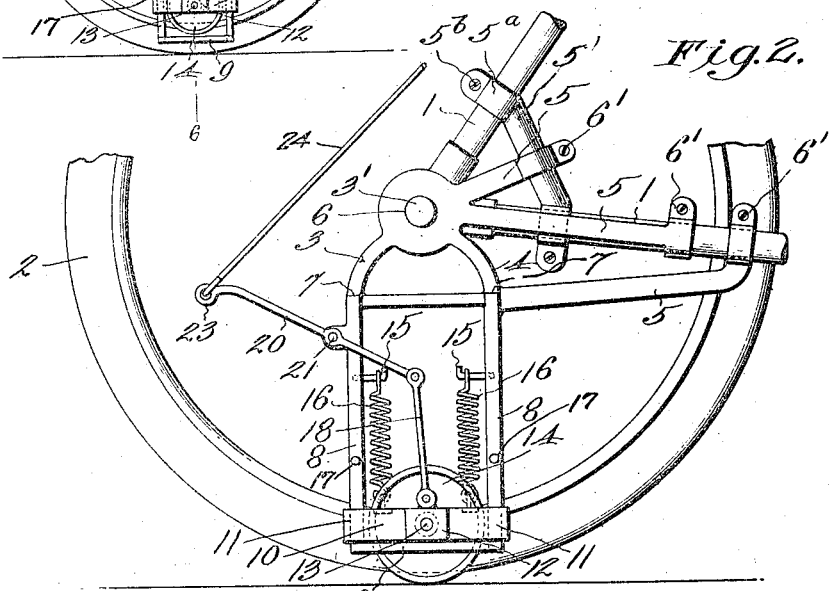
Figure 3:
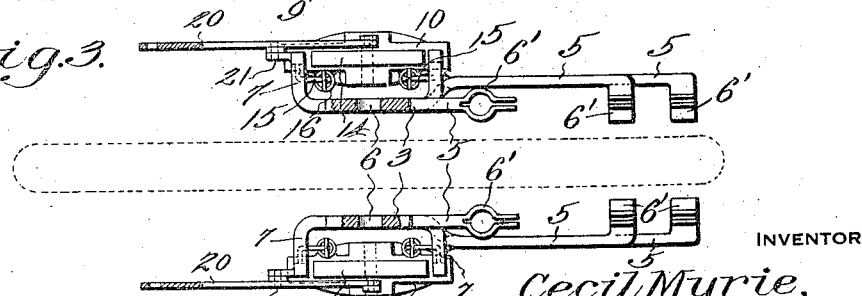

In the drawings:

Figure 1 is a side elevation showing the apparatus of this invention in its applied relation to a motor-cycle, the apparatus being shown in its raised or inoperative position, Fig. 2 is a similar view, parts being broken away, showing the balancing position of the ground wheels of the apparatus, Fig. 3 is a top plan view, Fig. 4 is a rear elevation, Fig. 5 is a sectional view approximately on the line 5—5 of Fig. 1, Fig. 6 is a sectional view approximately on the line 6—6 of Fig. 1, and Fig. 7 is a perspective view of one of the frames or supporting means for the apparatus.

Referring now to the drawings in detail, the numeral 1 designates the rear portion of the frame of an ordinary motor-cycle, 2 the rear wheel of the said motor-cycle, and 3' the axle therefor.

The improved apparatus is designed to be arranged upon the opposite sides of the motor-cycle at the rear thereof, and includes frame or supporting members 3, one arranged upon each side of the vehicle. As each of the frames are of a similar construction, the reference characters designating the parts of one are equally applicable to the parts of the other. The frame 3 includes an upper portion or head 4 to which is connected a plurality of brace members 5—5—5, the upper brace member 5 being provided with an opening 6 to receive the projecting end of the axle 3' of the rear wheel, and each of the said brace members is provided with clips 6' which engage with the various parts of the frame of the motor-cycle whereby to effect in positively sustaining the supporting members 3 upon the frame. The central brace member 5 has connected therewith an angle member 5' which has its ends provided with clips $5^a$, and suitable securing elements $5^b$ passing through the lip ends of the clips, whereby to retain the same upon the elements 1 at the rear of the motor cycle frame, and which construction and arrangement of parts materially adds to the rigidity with which the device is supported upon the motor frame. From the head of each of the frame or supports 3 are a pair of outwardly extending members 7—7 that terminate in parallel vertically disposed arms 8—8, and these arms are preferably but not necessarily square in cross section. The arms at the outer portions thereof are connected by a pair of oppositely arched members 9—9 so that the outer end of the frame is of an elliptical formation.

Arranged for vertical movement upon the arms 8 of each of the frame or supporting members 3 is a slidable member 10, the same having its opposite ends provided with bearing members 11—11 which embrace the vertical arms of the frame or supports 3 and the said member 10 is centrally formed with outwardly bulged portions 12 which have centrally passed therethrough an axle member 13 upon which is journaled a wheel 14 and this wheel when the slidable member 10 is brought through the outer end of the frame is adapted to project through the elliptical portion provided by the members 9—9 thereof and to contact with the ground over which the propelling wheel of the vehicle travels. The arms 8—8 at or below their juncture with the axle portion 7 with the supports 3 are each provided with a hook member 15 which is adapted each to receive one end of a helical spring 16. These springs have their opposite ends connected with the slidable member 10 whereby to elevate the said slidable member and to normally raise the same to bring the ground wheel 14 upward of the frame or support 3, and such upward movement may be limited by buffer members 17 secured upon the arms 8 and designed to contact with the upper surface of the member 10. The central bifurcated and widened portion of the slidable member 10 is provided with an upwardly extending bail-shaped member 18 the same being loosely connected to one end of a lever 20, the said lever being pivotally secured, as at 21, to what I will term the outer arm 8 of each of the supporting members 3. The lever 20 has its outer end preferably arranged at an angle and provided with an eye 23 within which is secured a flexible element, such as a wire member 24, and each of said wire members are trained over suitable pulleys 25—25 secured to the frame of the motor-cycle and having their ends connected and continued in a single strand 26, and this strand is secured to a pivot lever 27 that is arranged upon the top of the frame of the motor-cycle and which is provided with a handle operating spring pressed dog 28 that is designed to engage between the teeth of the segmental rack 29. By swinging the lever 27 in one direction, it will be noted that the lever 20 will be swung upon its pivot 21 causing both of the slidable members 10 to be forced downwardly of their respective frames or supports and permitting the ground wheels 14 thereof to contact with the surface over which the motor-cycle travels. In accordance with the force of such contact a braking effect may be had upon the receptacle and also in accordance with the pressure exerted upon the lever 27 the wheels 14 may be brought to elevate the rear wheel of the motor-cycle. The motor-cycle may be effectively retained in such elevated position by the pawl of the lever 27 engaging between the teeth of the rack, so that the device thus provides an effective stand for the motor-cycle and at the same time permits of the operator cranking the motor-cycle to start the engine without leaving his seat. When the motor-cycle is to be propelled the lever 27 is again actuated but in an opposite direction so as to permit of the springs 16 elevating the slidable member 10 and drawing the ground wheel 14 upwardly of the supporting frames 3, thus permitting the propelling wheel to contact with the ground.

It is to be noted that the lever 27 is arranged forward of the operator's seat and in close proximity to the operator, so that the lever may be conveniently grasped by the operator.

Having thus described the invention, what I claim is:

1. In combination with a motor-cycle, of frame members secured to the opposite sides thereof and including parallel depending arms, an elliptical member connecting the arms at the ends thereof, a slidable member between the arms of each frame and having bearings engaging with the said arms, spring means for normally moving the slidable members upward of the respective frames, buffer members for the slidable members, wheel members carried by the slidable members designed when the slidable members are moved downwardly of the respective frames to project through the elliptical ends of the said frames and contacting with the ground with which the driving wheel of the motor-cycle engages, a pivoted lever for each of the frames and connected one with each of the slidable members, a flexible connection for each of the levers, guide means for the flexible members, a strand connecting the flexible members, and operating mechanism connected with the strand and arranged in close proximity to the driver's seat.

2. In combination with a motor-cycle, of frame members secured to the opposite sides thereof and including spaced depending arms, a slidable member having bearings arranged upon the arms of each of the frames, spring means between the arms and the said slidable members for normally retaining the same in one position upon the frames, buffer means for the slidable members, a centrally connected wheel for each of the slidable members, a yoke secured to each of the slidable members, a pivoted lever for each of the frames and connected with the respective yokes, a flexible element connected with each of the levers, guide means for the flexible elements, a strand connecting the ends of the said flexible elements, a pivoted lever connected with the strand, a spring pressed pawl for the lever, and a segmental rack for the said pawl.

In testimony whereof I affix my signature.

CECIL MYRIE.

Copies of this patent may be obtained for five cents each, by addressing the "Commissioner of Patents, Washington, D. C."